United States Patent
Miyamoto et al.

(10) Patent No.: US 12,038,318 B2
(45) Date of Patent: Jul. 16, 2024

(54) CONVEYANCE MECHANISM AND COMBINATION WEIGHING APPARATUS

(71) Applicant: Ishida Co., Ltd., Kyoto (JP)

(72) Inventors: Hideshi Miyamoto, Ritto (JP); Mikio Kishikawa, Ritto (JP); Shinya Enami, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 556 days.

(21) Appl. No.: 17/195,033

(22) Filed: Mar. 8, 2021

(65) Prior Publication Data
US 2021/0285811 A1    Sep. 16, 2021

(30) Foreign Application Priority Data

Mar. 10, 2020  (JP) .................................. 2020-040883
Mar. 18, 2020  (JP) .................................. 2020-047425

(51) Int. Cl.
G01G 13/29       (2006.01)
B65D 88/26       (2006.01)
B65D 90/48       (2006.01)

(52) U.S. Cl.
CPC .......... *G01G 13/2918* (2013.01); *B65D 88/26* (2013.01); *B65D 90/48* (2013.01)

(58) Field of Classification Search
CPC ............ B65G 27/08; B65G 2812/0348; B65G 2812/0372; G01G 13/2918; G01G 13/2925
See application file for complete search history.

(56) References Cited

U.S. PATENT DOCUMENTS 4,683,966  A  *  8/1987  Nakagawa ............. G01G 13/02
                                                177/25.18
4,702,394  A  *  10/1987  Katzoka ................. B65G 27/08
                                                222/196
(Continued)

FOREIGN PATENT DOCUMENTS

CN         204710842 U      10/2015
JP         2014085165 A  *   5/2014
(Continued)

OTHER PUBLICATIONS

An Office Action mailed by China National Intellectual Property Administration on Jun. 2, 2022, which corresponds to Chinese Patent Application No. 20210254544.0 and is related to U.S. Appl. No. 17/195,033 with English language translation.

*Primary Examiner* — Natalie Huls
(74) *Attorney, Agent, or Firm* — Studebaker & Brackett PC

(57) ABSTRACT

A conveyance mechanism (1) includes: a trough (10) that conveys an article; a support member (20) to which the trough is detachably coupled, the support member including a vibrator that vibrates the trough; and a coupling member (30) that couples the trough and the support member. The trough includes a first abutting member (11) that is located on a back side of a conveyance face for conveyance of the article and abuts on the support member. The support member includes a second abutting member (21) that is plate-shaped and has a second circumferential edge (22) vertically identical to a first circumferential edge (12) that is a circumferential edge of the first abutting member. The coupling member couples the trough and the support member by fastening the first abutting member and the second abutting member with the first circumferential edge and the second circumferential edge in superposition. The second (Continued)

abutting member (21) is provided with a through hole (23) passing through the second abutting member.

12 Claims, 10 Drawing Sheets

(56) References Cited

U.S. PATENT DOCUMENTS

| | | | | |
|---|---|---|---|---|
| 5,773,765 A * | 6/1998 | Sashiki | ............... | B65G 27/08 |
| | | | | 177/25.18 |
| 5,946,891 A * | 9/1999 | Brence | ............... | B65G 27/32 |
| | | | | 53/493 |
| 6,037,549 A * | 3/2000 | Weck | ............... | G01G 19/393 |
| | | | | 222/196 |
| 6,365,845 B1 * | 4/2002 | Pearce | ............... | G01G 21/28 |
| | | | | 177/180 |
| 10,287,102 B2 * | 5/2019 | Peters | ............... | G01G 17/00 |
| 2005/0126893 A1 * | 6/2005 | Berger | ............... | B65G 27/32 |
| | | | | 198/763 |
| 2017/0297826 A1 * | 10/2017 | Kageyama | ............ | B65G 27/16 |
| 2023/0091619 A1 * | 3/2023 | Nagai | ............... | B65G 27/08 |
| | | | | 177/25.18 |

FOREIGN PATENT DOCUMENTS

| | | | |
|---|---|---|---|
| JP | 2015001508 A * | 1/2015 | |
| JP | 2017-026339 A | 2/2017 | |

\* cited by examiner

CONVEYANCE MECHANISM AND COMBINATION WEIGHING APPARATUS

CROSS-REFERENCE TO RELATED APPLICATION

This application is based upon and claims the benefit of priority from Japanese Patent Applications No. 2020-040883 filed on Mar. 10, 2020 and No. 2020-047425 filed on Mar. 18, 2020 in Japan, the entire contents of which are incorporated herein by reference.

BACKGROUND

Technical Field

The present invention relates to a conveyance mechanism of conveying an article, and relates particularly to a conveyance mechanism for use in a combination weighing apparatus including a plurality of weighing hoppers.

Background Art

JP 2017-26339 A discloses a conveyance mechanism including: a trough that conveys an article; and a support member to which the trough is detachably coupled, the support member including a vibrator that vibrates the trough.

The conveyance mechanism in JP 2017-26339 A includes: a first plate provided at the trough; a second plate provided at the support member; and a fastening band laterally fastening the respective circumferential edges of the first plate and the second plate with the circumferential edges in vertical superposition, the fastening band pressurizing the circumferential edges from above and from below. In the conveyance mechanism of conveying an article supplied to the trough, the trough with which an article comes in contact is regularly cleansed. Thus, the trough is attachable to and detachable from the support member, easily.

SUMMARY OF THE INVENTION

Technical Problem

At the time of cleansing of such a conveyance mechanism, generally, the trough is cleansed and additionally the support member is cleansed with the trough detached therefrom. In this case, the support member kept installed in the conveyance mechanism is cleansed. The second plate of the support member is plate-shaped, extending planarly, and thus moisture due to cleansing remains easily thereon. Thus, at the time of reassembly, the moisture is likely to remain on the second plate. Assembly with moisture remaining on the second plate causes unhygienic fears, such as moisture degradation and leakage. In particular, a conveyance mechanism of conveying a food as an article requires a hygienic guarantee with an enhancement in the drainage of the support member.

Therefore, an object of the present invention is to provide a plate-shaped abutting member enhanced in drainage in a support member that supports a trough that conveys an article.

Solution to Problem

A conveyance mechanism according to an aspect includes: a trough (10) that conveys an article; a support member (20) to which the trough is detachably coupled, the support member including a vibrator that vibrates the trough; and a coupling member that couples the trough and the support member. The trough includes a first abutting member (11) that is located on a back side of a conveyance face for conveyance of the article and abuts on the support member. The support member includes a second abutting member (21) that is plate-shaped and has a second circumferential edge (22) vertically identical to a first circumferential edge (12) that is a circumferential edge of the first abutting member. The coupling member couples the trough and the support member by fastening the first abutting member and the second abutting member with the first circumferential edge and the second circumferential edge in superposition. The second abutting member (21) is provided with a through hole (23) passing through the second abutting member. According to the present aspect, the second abutting member of the support member has the through hole, so that moisture on the second abutting member that is plate-shaped can be discharged through the through hole, resulting in an enhancement in the drainage of the second abutting member.

According to a preferred aspect, the second abutting member includes, in a coupling state where the second abutting member is coupled to the first abutting member by the coupling member, an abutting face (25) abutting on the first abutting member and a non-abutting face (26) spaced apart from the first abutting member. At least part of the through hole is provided at the non-abutting face. According to the present aspect, in the coupling state, the non-abutting face of the second abutting member does not abut on the first abutting member, so that the first abutting member does not occlude the through hole of the non-abutting face. Thus, even in the coupling state, moisture on the second abutting member can be discharged through the through hole.

According to a preferred aspect, the second abutting member includes a wall (27) extending from the abutting face to the non-abutting face, away from the first abutting member. At least part of the through hole is provided astride the wall and the non-abutting face. According to the present aspect, the wall functions as a reinforcing rib, resulting in a rise in the rigidity of the second abutting member, in comparison to a mode in which the entirety of the second abutting member is smoothly plate-shaped. Therefore, even with the through hole provided at the second abutting member, the second abutting member can be inhibited from deforming, so that the function of supporting the trough can be retained. In addition, the through hole is astride side faces facing in different directions (the wall and the non-abutting face), so that draining can be performed through the plurality of side faces, resulting in a further enhancement in drainage.

According to a preferred aspect, the first abutting member and the second abutting member have an oval shape with a long-axis direction (LD) and a short-axis direction (SD). At least part of the through hole is provided at an end in the long-axis direction of the second abutting member. According to the present aspect, because the first abutting member and the second abutting member are each oval in shape, mutual positioning is easier, resulting in an enhancement in operability at the time of coupling, in comparison to a configuration in which the first abutting member and the second abutting member are each perfectly circular in shape. The through hole is provided at the end in the long-axis direction of the oval shape, resulting in an easy enhancement in drainage over the entire region in the long-axis direction of the second abutting member.

According to a preferred aspect, the second abutting member is disposed at a slant from a horizontal direction (HD). At least part of the through hole is disposed below a center in a vertical direction of the second abutting member. According to the present aspect, moisture on the second abutting member is guided to the lower portion of the second abutting member. The through hole is provided below the center in the vertical direction of the second abutting member, so that the moisture guided downward can be discharged through the through hole.

According to a preferred aspect, the vibrator (28) is coupled to a face opposite to a face that the second abutting member has closer to the first abutting member. The support member includes a waterproof cover (29) covering a coupled portion between the vibrator and the second abutting member. The through hole is provided closer to the second circumferential edge than to a region overlapping the waterproof cover. According to the present aspect, moisture remaining on the second abutting member can be discharged outside the waterproof cover covering the vibrator without being discharged in the waterproof cover. Thus, an enhancement can be made in drainage on the second abutting member with a waterproof guarantee on the waterproof cover.

A combination weighing apparatus according to an aspect includes: a plurality of the above conveyance mechanisms; a supply mechanism of supplying articles; a plurality of weighing hoppers that is provided downstream of the supply mechanism and each temporarily stores an article in order to measure a weight of the article; and a gathering chute that gathers the articles discharged from the plurality of weighing hoppers. The plurality of the conveyance mechanisms conveys the articles supplied from the supply mechanism, to the plurality of weighing hoppers. According to the present aspect, each trough hygienically conveys an article to be conveyed. Thus, acquired can be an aggregate of articles weighed as a predetermined value with a hygienic guarantee on articles.

DESCRIPTION OF EMBODIMENTS

A conveyance mechanism 1 and a combination weighing apparatus 100 according to an embodiment will be described below with reference to the drawings. Note that, in the following drawings, the same or similar parts are denoted with the same or similar reference signs. It should be noted that the drawings are schematic and, for example, the ratio between each dimension is different from the real in some cases. Therefore, for example, specific dimensions should be understood in consideration of the following descriptions. In addition, in some cases, parts between the drawings are different in the relationship or ratio between mutual dimensions.

Figure 1:
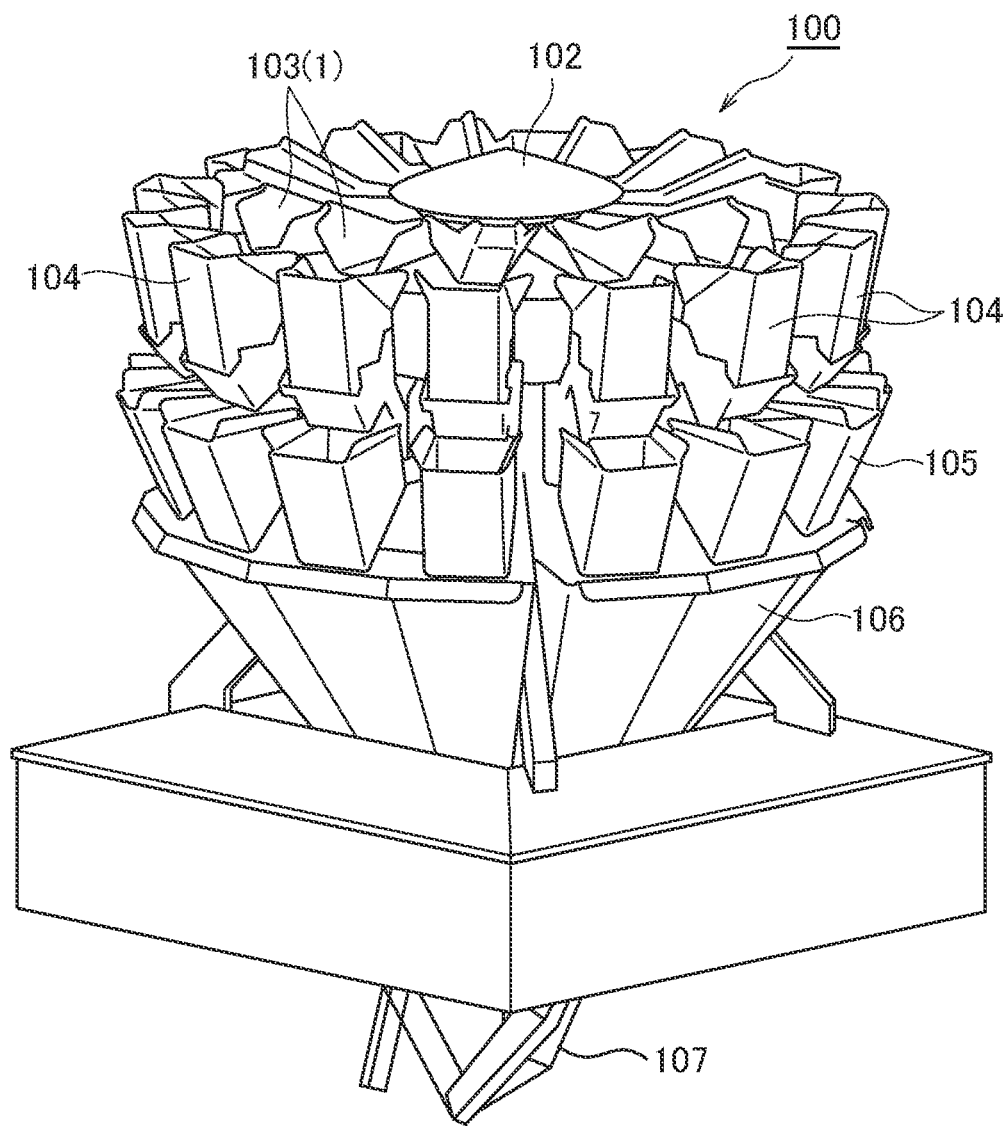
FIG. 1 is an entire perspective view of a combination weighing apparatus.
Figure 2:
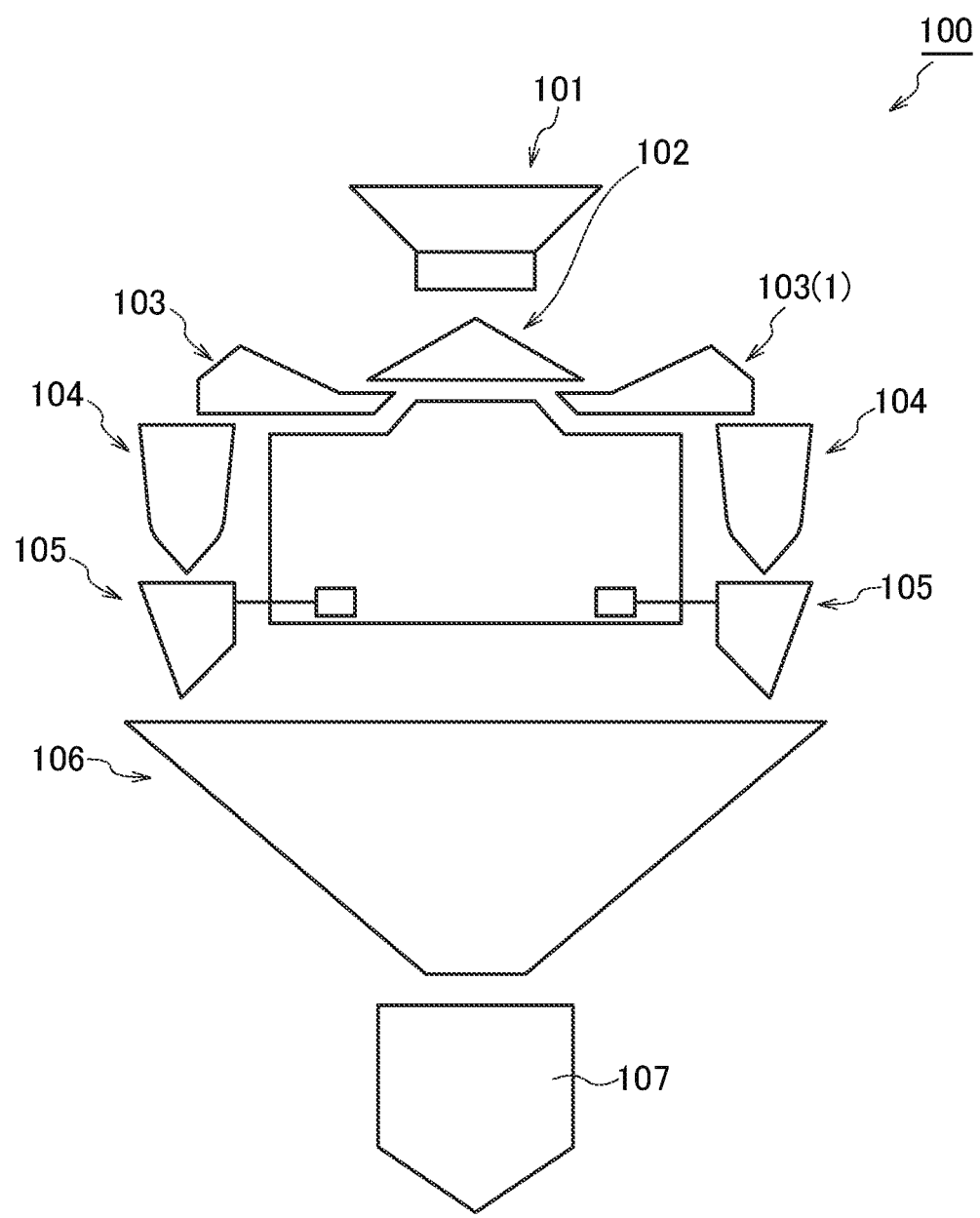
FIG. 2 is a schematic view of the combination weighing apparatus.

An embodiment of the present invention will be described below with reference to FIGS. 1 to 5. FIG. 1 is an entire perspective view of the combination weighing apparatus 100. FIG. 2 is a schematic view of the combination weighing apparatus 100. The combination weighing apparatus 100 may include a supply chute 101, a distribution table 102, a radial feeder 103, a pool hopper 104, a weighing hopper 105, a gathering chute 106, and a timing hopper 107.

The combination weighing apparatus 100 weighs and conveys an article as a target to be weighed. The article is, for example, a food. Such articles are put into the supply chute 101, and then the articles put in the supply chute 101 are supplied to the distribution table 102. The distribution table 102 may convey the articles in a distributing manner. The distribution table 102 supplies the articles to a plurality of radial feeders 103 disposed around the distribution table 102. The radial feeders 103 each convey the article supplied from the distribution table 102, to the pool hopper 104 provided corresponding to the radial feeder 103. Note that the "supply mechanism" according to the present invention may be adopted to at least either a supply chute 101 or a distribution table 102, and the "conveyance mechanism" according to the present invention may be adopted to a radial feeder 103. Note that the conveyance mechanism according to the present embodiment is adopted to a radial feeder. However, the conveyance mechanism according to the present invention is not limited to a radial feeder and thus may be provided as a mechanism for a supply chute, a gathering chute, or a pool hopper in a combination weighing apparatus. The conveyance mechanism will be described in detail later.

The article supplied to each pool hopper 104 may be received by the weighing hopper 105 disposed below the corresponding pool hopper 104. Each weighing hopper 105 is disposed downstream of the supply mechanism and temporarily stores the article in order to measure the weight of the article. On the basis of the weight value of the article weighted by each weighing hopper 105, a combination weighing operation may be performed. A combination of articles may be selected such that the result of the combination weighing operation is in a predetermined allowable range and is closest to a target value. The articles in the weighing hoppers 105 included in the selected combination may be discharged to the gathering chute 106. The gathering chute 106 gathers the articles discharged from the plurality of weighing hoppers 105. The articles discharged to the gathering chute 106 may be supplied to the timing hopper 107. The timing hopper 107 may supply the articles to, for example, a packaging apparatus installed at the post stage of the conveyance mechanism 1.

Figure 3:
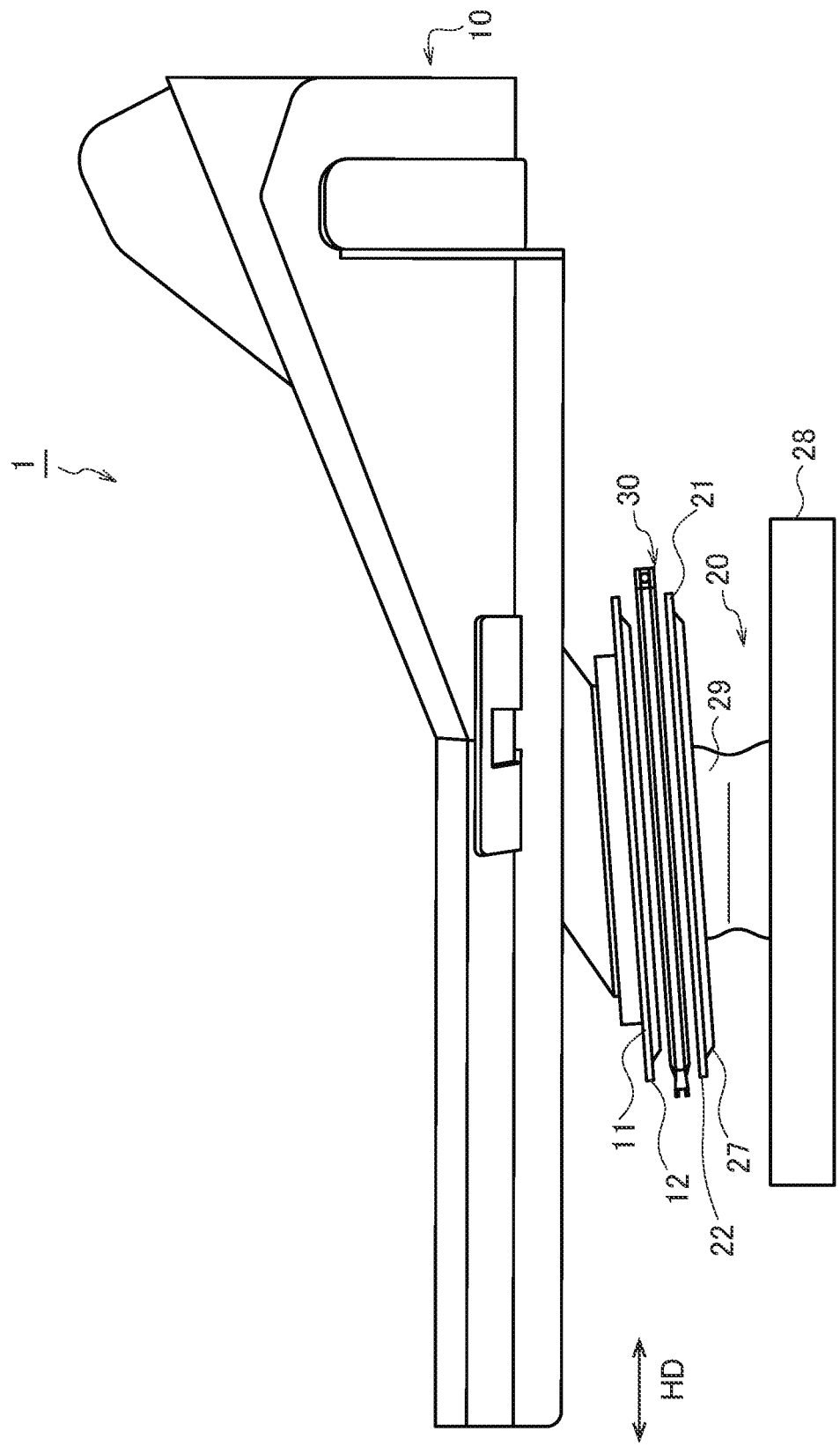
FIG. 3 is an exploded side view of a conveyance mechanism.
Figure 4:
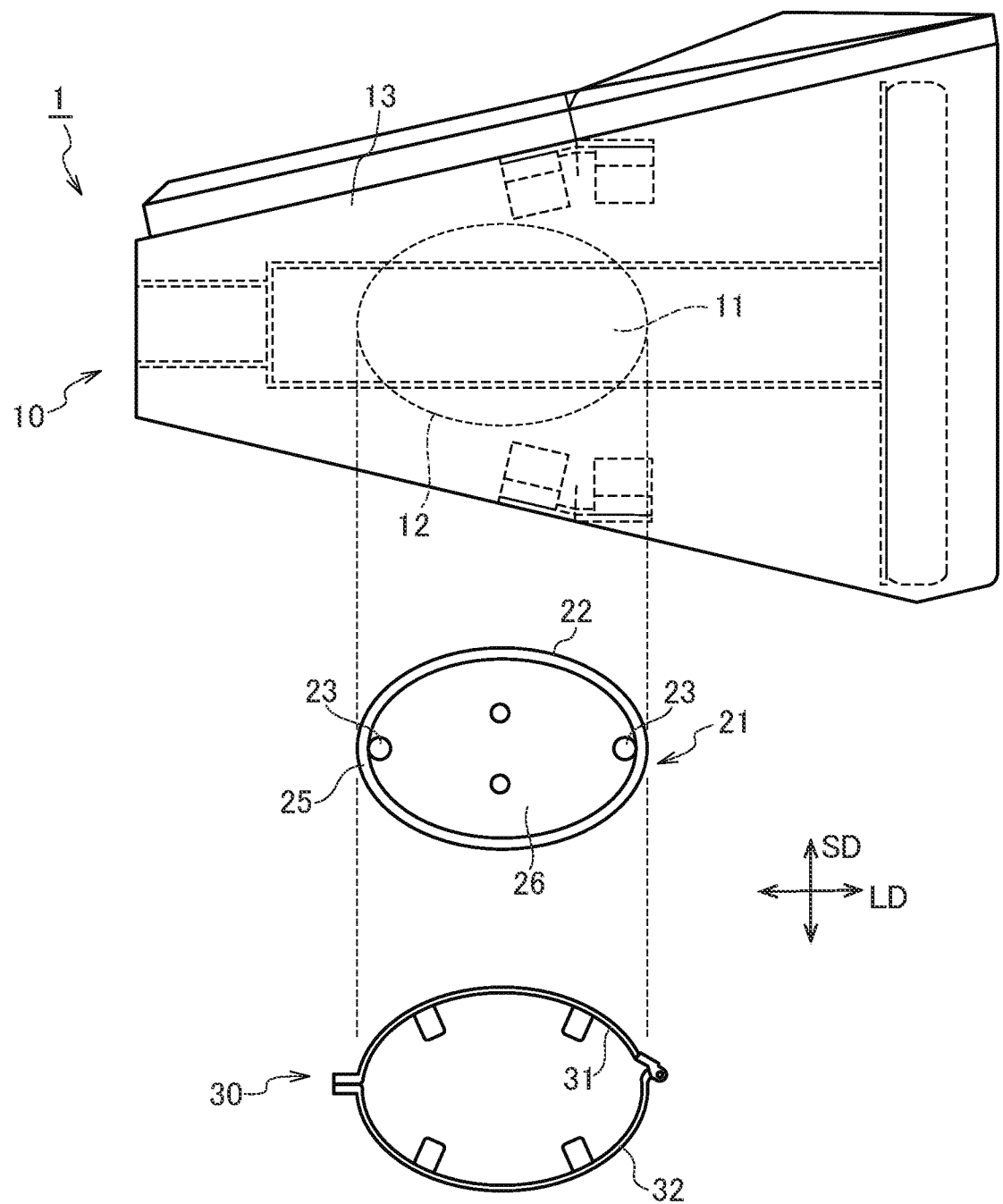
FIG. 4 is an exploded plan view of the conveyance mechanism.
Figure 5:
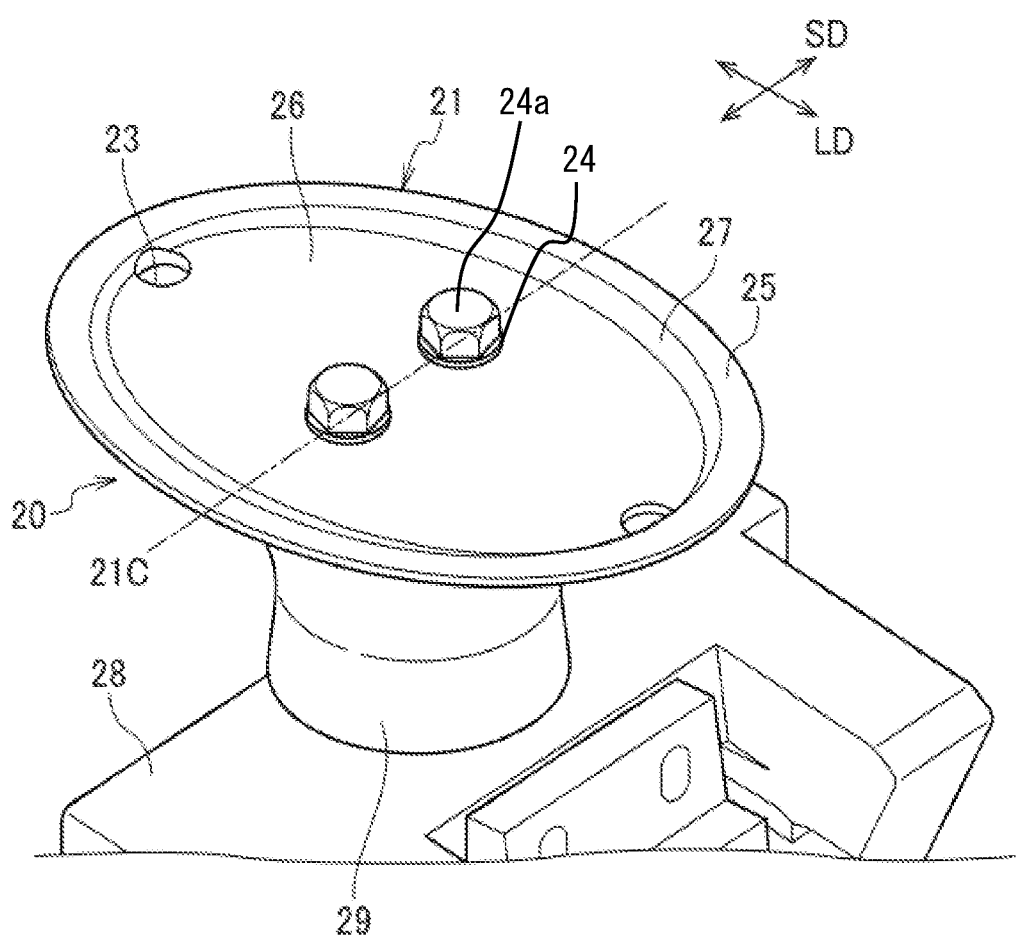
FIG. 5 is a perspective view of a support member.

Next, the conveyance mechanism 1 will be described in detail on the basis of FIGS. 3 to 5. FIG. 3 is an exploded side view of the conveyance mechanism 1. FIG. 4 is an exploded plan view of the conveyance mechanism 1. Note that, for convenience of description, in FIG. 4, only a second abutting member 21 is illustrated for a support member 20. FIG. 5 is a perspective view of the support member 20. As described above, the conveyance mechanism 1 according to the present embodiment is adopted to a radial feeder 103.

The conveyance mechanism 1 may include a trough 10, the support member 20, and a coupling member 30. The trough 10 conveys an article. The trough 10 includes a conveyance face (conveyance member) 13 for conveyance of an article and a first abutting member 11 that is located on the back side of the conveyance face and abuts on the support member 20. The conveyance face 13 extends in the radial direction of the combination weighing apparatus 100 and guides an article to the weighing hopper 105 through the pool hopper 104. The first abutting member 11 may be plate-shaped and have an oval shape with a long-axis direction LD and a short-axis direction SD. Note that the first abutting member 11 is not necessarily plate-shaped and thus may be columnar or rectangularly parallelepipedic. For example, the bottom face of the first abutting member 11 that is columnar may abut on the second abutting member 21. The first abutting member 11 is not necessarily oval and thus may be perfectly circular or rectangular in shape.

The trough 10 is detachably coupled to the support member 20. The support member 20 includes the second abutting member 21 that abuts on the trough 10. The second abutting member 21 has a second circumferential edge 22 vertically identical to a first circumferential edge 12 that is the circumferential edge of the first abutting member 11. The second abutting member 21 may be plate-shaped and have an oval shape with a long-axis direction LD and a short-axis direction SD. The first circumferential edge 12 may be identical in shape to the second circumferential edge 22.

In the coupling state where the second abutting member 21 is coupled to the first abutting member 11 by the coupling member 30, the second abutting member 21 may include an abutting face 25 that abuts on the first abutting member 11, a non-abutting face 26 spaced apart from the first abutting member 11, and a wall 27 extending from the abutting face 25 to the non-abutting face 26, away from the first abutting member 11. The abutting face 25 is provided along the second circumferential edge 22, ranging over the entirety of the second circumferential edge 22. The non-abutting face 26 is spaced apart from the second circumferential edge 22 and is provided, in plan view, inside the abutting face 25. The non-abutting face 26 is surrounded with the abutting face 25 and is recessed below the abutting face 25. The circumferential edge of the non-abutting face 26 is similar in shape to the second circumferential edge 22. The wall 27 is interposed between the abutting face 25 and the non-abutting face 26.

The support member 20 includes a vibrator 28 that vibrates the trough 10. The vibrator 28 is coupled to the opposite face to a face that the second abutting member 21 has closer to the first abutting member 11. In other words, the vibrator 28 is coupled to the lower face of the second abutting member 21. The support member 20 includes a waterproof cover 29 covering the coupled portion between the vibrator 28 and the second abutting member 21.

The coupling member (fastening band) 30 couples the trough 10 and the support member 20, detachably. The coupling member 30 may include a first frame 31 and a second frame 32. The first frame 31 and the second frame 32 each cover half of the first circumferential edge 12 (half of the second circumferential edge 22). One end of the first frame 31 and one end of the second frame 32 are coupled pivotably. The coupling member 30 fastens the first circumferential edge 12 of the first abutting member 11 and the second circumferential edge 22 of the second abutting member 21 in vertical superposition. More specifically, with the first circumferential edge 12 and the second circumferential edge 22 in superposition, the coupling member 30 laterally fastens the circumferential edges with the first frame 31 and the second frame 32 and pressurizes the circumferential edges from above and from below. In this manner, the coupling member 30 couples the trough 10 and the support member 20 together.

For a hygienic guarantee on the conveyance mechanism 1 having such a configuration, a user detaches the trough 10 and the coupling member 30 from the support member 20 and regularly cleanses the trough 10, the support member 20, and the coupling member 30. In this case, the support member 20 kept installed in the conveyance mechanism 1 is cleansed. The second abutting member 21 of the support member 20 is plate-shaped, extending planarly, and thus moisture due to cleansing remains easily thereon. The conveyance mechanism 1 according to the present embodiment has the second abutting member 21 enhanced in drainage in the support member 20. Next, the configuration of the second abutting member 21 enhanced in drainage will be described.

The second abutting member 21 is provided with a through hole (a first through hole) 23 passing through the second abutting member 21 and a through hole (a second through hole) 24 through which a fastener 24a is inserted. Because the second abutting member 21 has the through hole 23, moisture on the second abutting member 21 that is plate-shaped can be discharged through the through hole 23, resulting in an enhancement in the drainage of the second abutting member 21. According to the present embodiment, two through holes 23 are provided apart in the long-axis direction LD. However, this configuration is not limitative, the number of through holes 23 may be one or three or more. The through holes 23 may be provided apart in the short-axis direction SD.

At least part of the through holes 23 may be provided at the non-abutting face 26. Note that part of the plurality of through holes 23 (e.g., one through hole) may be provided at the non-abutting face 26 or part of each through hole 23 may be provided at the non-abutting face 26. In the coupling state, the non-abutting face 26 of the second abutting member 21 does not abut on the first abutting member 11, so that the first abutting member 11 does not occlude the through holes 23 of the non-abutting face 26. Because of the through holes 23 at least partially provided at the non-abutting face 26, even in the coupling state, moisture on the second abutting member 21 can be discharged through the through holes 23.

The through holes 23 may be each provided astride the wall 27 and the non-abutting face 26. In comparison to a mode in which the entirety of the second abutting member 21 is smoothly plate-shaped, the wall 27 of the second abutting member 21 enables a rise in the rigidity of the second abutting member 21 because the wall 27 functions as a reinforcing rib. Therefore, even with the through holes 23 provided at the second abutting member 21, the second abutting member 21 can be inhibited from deforming, so that the function of supporting the trough 10 can be retained. In addition, each through hole 23 is astride side faces facing in different directions (the wall 27 and the non-abutting face 26), so that draining can be performed through the plurality of side faces, resulting in a further enhancement in drainage.

The first abutting member 11 and the second abutting member 21 may each have an oval shape with a long-axis direction LD and a short-axis direction SD. In comparison to a configuration in which the first abutting member 11 and the second abutting member 21 are each perfectly circular in shape, because the first abutting member 11 and the second abutting member 21 are each oval in shape, mutual positioning is easier, resulting in an enhancement in operability at the time of coupling. At least part of the through holes 23 may be provided at the ends in the long-axis direction LD.

The length in the long-axis direction LD of the second abutting member 21 is longer than the length in the short-axis direction SD of the second abutting member 21, and thus draining is likely to be difficult to perform over the entire region in the long-axis direction. However, the through holes 23 are provided at the ends in the long-axis direction LD, resulting in an easy enhancement in drainage over the entire region in the long-axis direction LD of the second abutting member 21.

As illustrated in FIG. 3, the second abutting member 21 is disposed at a slant from the horizontal direction HD. Thus, at least part of the through holes 23 may be disposed below the center 21C in the vertical direction of the second abutting member 21. Moisture on the second abutting member 21 is guided by gravity to the lower portion of the second abutting member 21. A through hole 23 is provided below the center 21C in the vertical direction of the second abutting member 21, so that the moisture guided downward can be discharged through the through hole 23. According to the present embodiment, one of the through holes 23 is disposed below the center 21C in the vertical direction of the second abutting member 21 and the other through hole 23 is disposed above the center 21C in the vertical direction of the second abutting member 21. The plurality of through holes 23 is disposed apart in the vertical direction across the center 21C in the vertical direction of the second abutting member 21, so that draining can be performed a plurality of times in the process of downward guiding of moisture on the second abutting member 21, resulting in a further enhancement in drainage.

The through holes 23 may be provided closer to the second circumferential edge 22 than to the region overlapping the waterproof cover 29. That is, in plan view, the through holes 23 may be provided outside the waterproof cover 29. Moisture remaining on the second abutting member 21 can be discharged outside the waterproof cover 29 covering the vibrator 28 without being discharged in the waterproof cover 29. Thus, an enhancement can be made in drainage on the second abutting member 21 with a waterproof guarantee on the waterproof cover 29.

As described above, such conveyance mechanisms 1 are used in the combination weighing apparatus 100 and each causes an article supplied from the supply mechanism, to be conveyed to the corresponding weighing hopper 105. The second abutting member 21 enhanced in drainage in the support member 20 in each conveyance mechanism 1 enables the trough 10 to hygienically conveys an article to be conveyed. The combination weighing apparatus 100 including the conveyance mechanisms 1 can acquire an aggregate of articles weighed as a predetermined value with a hygienic guarantee on articles.

As above, in such a conveyance mechanism of conveying an article supplied to the trough, the trough with which an article comes in contact is regularly cleansed. Thus, a juncture in the trough requires continuous welding in order to prevent moisture from coming inside from around. However, in a mode in which a plate member and a conveyance member project outside the juncture, it is difficult to keep the leading end of a welding torch in contact with the juncture. In particular, securing a large area of conveyance face for conveyance of an article causes an increase in the area of the outward projection of the conveyance member. Thus, continuous welding is likely to be difficult. In a mode in which the sectional shape of the juncture is not perfectly circular but is oval, continuous welding is required over the entire circumference of the oval shape. However, the juncture is difficult of access in the long-axis direction of the oval shape. Thus, continuous welding is likely to be difficult.

Therefore, a conveyance mechanism enabling easily continuous welding of a coupling member that couples the conveyance member and the plate member in the trough, and a combination weighing apparatus including the conveyance mechanism will be described.

Figure 6:
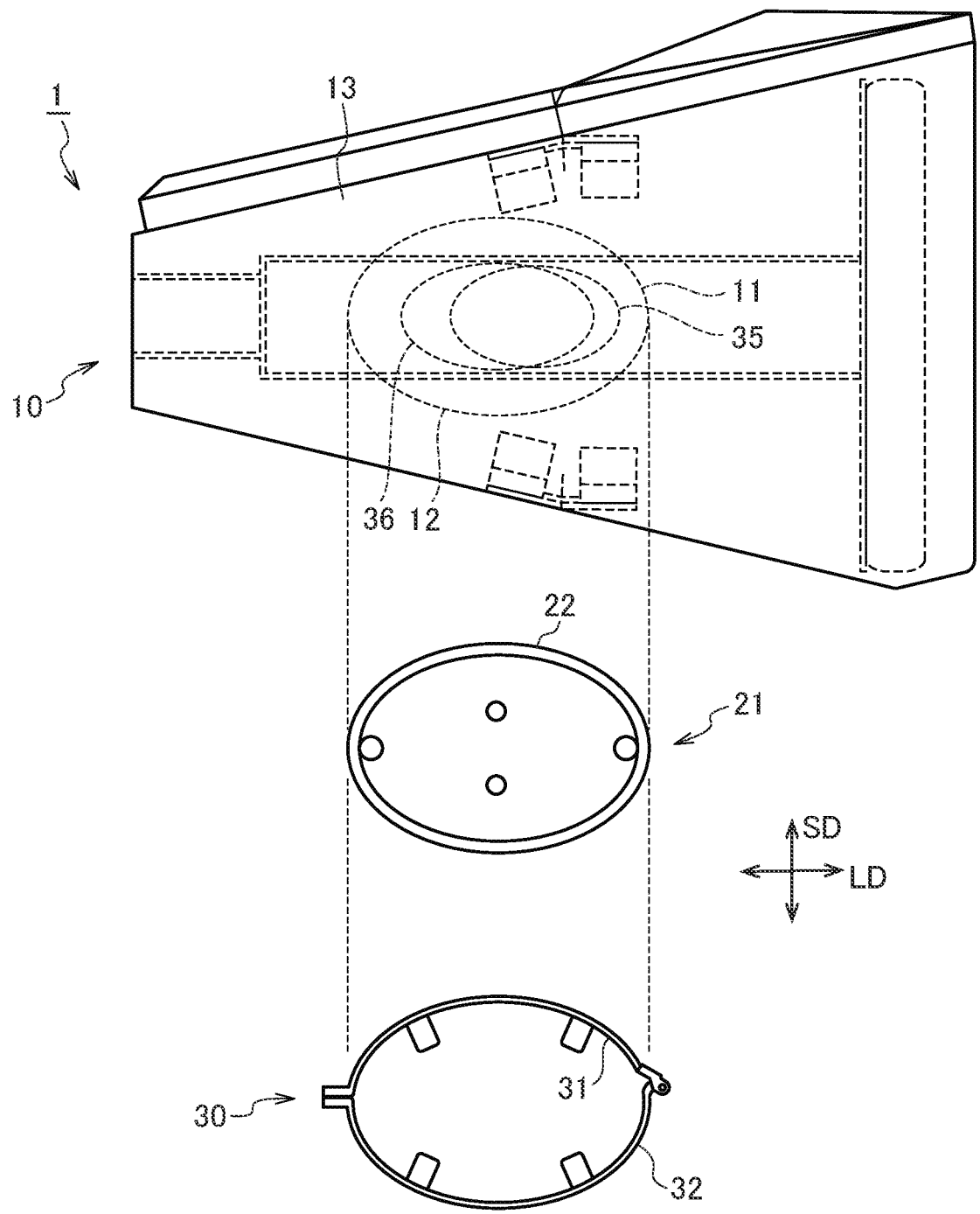
FIG. 6 is an exploded plan view of the conveyance mechanism.
Figure 7:
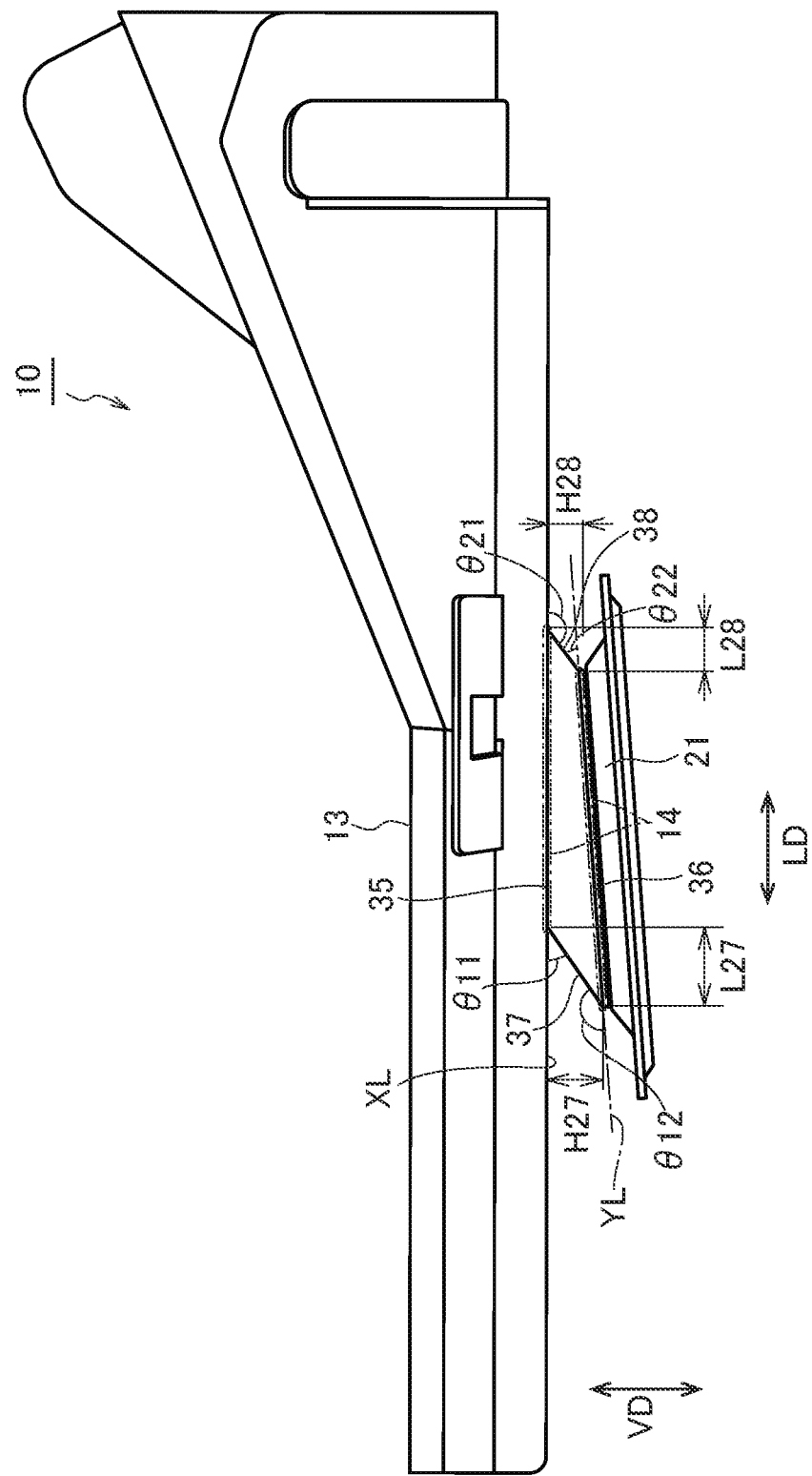
FIG. 7 is a side view of a trough.
Figure 8:
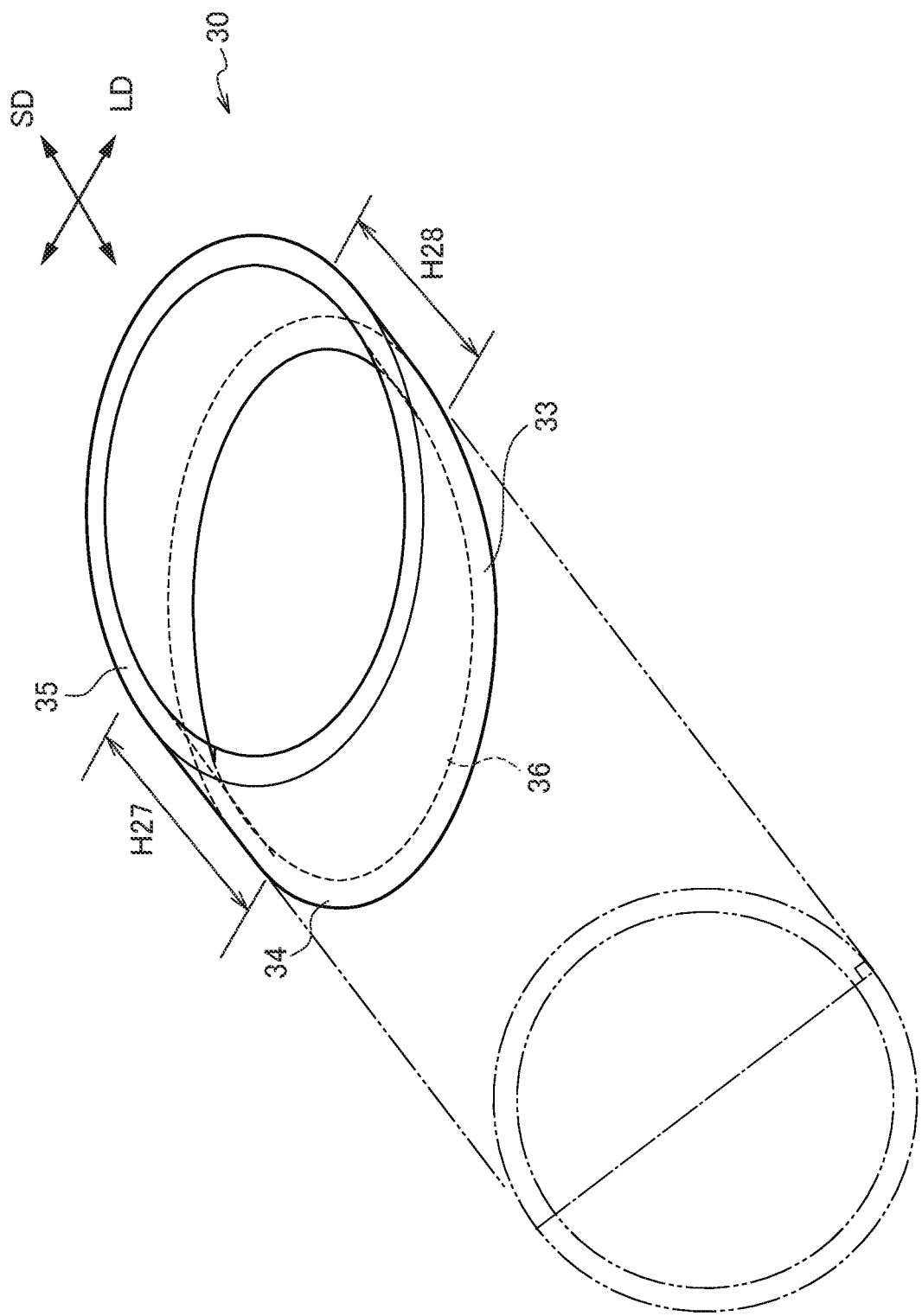
FIG. 8 is a perspective view of a coupling member.

The description will be given with a focus on the difference from the configuration described above, with reference to FIGS. 6 to 10. FIG. 6 is an exploded plan view of the conveyance mechanism 1. Note that, in FIG. 6, for convenience of description, only the second abutting member 21 is illustrated for the support member 20. FIG. 7 is a schematic side view of the trough 10. FIG. 8 is a perspective view of the coupling member 30.

The conveyance face 13 and the first abutting plate member 11 are individually produced, and then the conveyance face 13 and the first abutting member 11 are coupled by the coupling member 30, so that the trough 10 can be produced. In this case, preferably, the coupled portion between each member is continuously welded in order to prevent moisture from coming inside the conveyance mechanism 1 at the time of cleansing of the conveyance mechanism 1. The conveyance mechanism 1 according to the present embodiment enables easily continuous welding of the coupling member 30 that couples the conveyance face 13 and the first abutting member 11 in the trough 10. Next, the configuration of the coupling member 30 enhanced in operability at the time of welding will be described.

The coupling member 30 is circular in section. That is the coupling member 30 may be columnar or cylindrical in shape. As illustrated in FIG. 8, the coupling member 30 according to the present embodiment is cylindrical in shape, having an inner circumferential face and an outer circumferential face 34. The coupling member 30 includes a wall 33 extending in the axial direction of the coupling member 30 circular in section, an upper-end face 35 that is located at the upper end of the wall 33 and abuts on the conveyance face 13, and a lower-end face 36 that is located at the lower end of the wall 33 and abuts on the support member 20. At least either the upper-end face 35 or the lower-end face 36 is a non-perpendicular end face that has an oval shape with a long-axis direction LD and a short-axis direction SD and is non-perpendicular in angle to the outer circumferential face 34 of the wall 33. Note that the angle to the outer circumferential face of the wall 33 may be the angle to the outer circumferential face in sectional view along the long-axis direction LD (section illustrated in FIG. 7) or may be the angle to the outer circumferential face in sectional view along the short-axis direction SD. That is the angle to any part of the outer circumferential face of the wall 33 is at least required. According to the present embodiment, the upper-end face 35 and the lower-end face 36 each have an angle different from 90 degrees to the outer circumferential face. Thus, the upper-end face 35 and the lower-end face 36 are each a non-perpendicular end face. Note that, in another mode, either the upper-end face 35 or the lower-end face 36 may be a non-perpendicular end face.

The non-perpendicular end face is non-perpendicular in angle to the outer circumferential face of the wall 33, namely, has an angle different from 90 degrees. The non-perpendicular end face has an angle different from 90 degrees to the outer circumferential face, and has a larger sectional area, in comparison to a mode in which the angle to the outer circumferential face is 90 degrees. A larger sectional area of the non-perpendicular end face facilitates access to the juncture of the non-perpendicular end face, so that the juncture is continuously welded easily. A larger sectional area of the non-perpendicular end face enables securing of the juncture in length, so that a rise can be made in juncture strength. In FIG. 7, junctures 14 of the coupling member 30 (the juncture between the upper-end face 35 of the coupling member 30 and the conveyance face 13 and the juncture between the lower-end face 36 of the coupling member 30 and the first abutting member 11) are each surrounded and indicated with a dot-and-dash line. In a mode in which the non-perpendicular end face is oval in shape, the length in the long-axis direction LD can be secured long. The long-axis direction LD is disposed corresponding to a portion to which it is difficult to put a welding torch, so that an enhancement can be made in the accessibility of the welding torch.

The sectional shape of the coupling member 30 at 90 degrees to the outer circumferential face 34 of the wall 33 may be perfectly circular. In FIG. 8, the sectional shape of the coupling member 30 at 90 degrees to the outer circumferential face 34 of the wall 33 is indicated with chain double dashed lines. In a mode in which the sectional shape at 90 degrees to the outer circumferential face of the wall 33 is perfectly circular, diagonally cutting a cylinder perfectly circular in shape or a column perfectly circular in shape enables acquisition of a non-perpendicular end face oval in shape. An appropriate change in cutting angle enables appropriate setting of the aspect ratio of an oval shape, so that the coupling member 30 having a sectional shape having a desired aspect ratio can be acquired. The long-axis direction LD of the non-perpendicular end face may be non-perpendicular to the outer circumferential face 34 of the wall 33. Because the long-axis direction LD of the non-perpendicular end face is non-perpendicular to the outer circumferential face 34, the wall 33 extends at a slant from the long-axis direction LD instead of extending perpendicularly to the long-axis direction LD. Therefore, the position of the upper-end face 35 located at the upper end of the wall 33 and the position of the lower-end face 36 located at the lower end of the wall 33 are not identical in the long-axis direction LD. Thus, in comparison to a configuration in which the position of the upper-end face 35 and the position of the lower-end face 36 are identical, the leading end of the welding torch is inserted easier, so that the junctures are continuously welded easier.

The upper-end face 35 and the lower-end face 36 are each a non-perpendicular end face. The upper-end face 35 in the long-axis direction LD and the lower-end face 36 in the long-axis direction LD are not parallel. Thus, the distance between the upper-end face 35 and the lower-end face 36 on one end side in the long-axis direction LD is different from the distance between the upper-end face 35 and the lower-end face 36 on the other end side in the long-axis direction LD. As illustrated in FIG. 7, in a section along the long-axis direction LD and the vertical direction VD, the wall 33 includes a first wall 37 located on one side in the long-axis direction LD and a second wall 38 located on the other side in the long-axis direction LD. The length H27 in the vertical direction VD of the first wall 37 is longer than the length H28 in the vertical direction VD of the second wall 38. The length L28 in the long-axis direction LD of the second wall 38 is shorter than the length L27 in the long-axis direction LD of the first wall 37. Therefore, in FIG. 7, the left wall located on the left is the first wall 37 and the right wall on the right is the second wall 38.

A first upper angle θ11 between the outer circumferential face 34 of the first wall 37 and an upper-end imaginary line XL extending outward from the upper-end face 35 in the long-axis direction LD along the upper-end face 35 is acute. A second upper angle θ21 between the outer circumferential face 34 of the second wall 38 and the upper-end imaginary line XL is obtuse. A first lower angle θ12 between the outer circumferential face 34 of the first wall 37 and a lower-end imaginary line YL extending outward from the lower-end face 36 in the long-axis direction LD along the lower-end face 36 is obtuse. A second lower angle θ22 between the outer circumferential face 34 of the second wall 38 and the lower-end imaginary line YL is acute. Because the first upper angle θ11 between the outer circumferential face 34 of the first wall 37 and the upper-end imaginary line XL is acute, the angle between the first wall 37 and the conveyance face 13 is small. The upper-end face of the outer circumferential face 34 of the first wall 37 at the first upper angle θ11 is located, in the long-axis direction, inside the lower-end face of the outer circumferential face 34 of the first wall 37 at the first lower angle θ12, causing inconvenience in the accessibility of the welding torch. However, the length H27 in the vertical direction VD of the first wall 37 is long, causing a wide space between the members even with a small angle between the members. Thus, an enhancement can be made in the accessibility of the welding torch. Because the second lower angle θ22 between the outer circumferential face 34 of the second wall 38 and the lower-end imaginary line YL is acute, the angle between the second wall 38 and the first abutting member 11 is small. The lower-end face of the outer circumferential face 34 of the second wall 38 at the second lower angle θ22 is located, in the long-axis direction, inside the upper-end face of the outer circumferential face 34 of the second wall 38 at the second upper angle θ21, causing inconvenience in the accessibility of the welding torch. However, the length L28 in the long-axis direction LD of the second wall 38 is short, so that the length by which the juncture 14 is recessed inside in the long-axis direction LD is relatively short. That is the length by which the welding torch is inserted can be shortened. Thus, even with a small angle between the members and a narrow space between the members, the juncture is continuously welded easily with the leading end of the welding torch in contact with the juncture.

The coupling member 30 is joined to both of the first abutting member 11 and the conveyance face 13. The coupling member 30 is not particularly limited in joining order. Preferably, a relatively large area of member is joined and then a relatively small area of member is joined. In comparison to a case where a large area of member is welded and then a small area of member is welded, an enhancement can be made in the accessibility of the welding torch in the latter half of welding work. According to the present embodiment, the area of the first abutting member 11 is smaller than the area of the conveyance face 13. Thus, the first abutting member 11 may be joined to the coupling member 30 after the conveyance face 13 is joined to the coupling member 30.

Either the upper-end face 35 or the lower-end face 36 is required to be a non-perpendicular end face. Next, with a focus on one face of both end faces of the coupling member 30, a preferred positional relationship between the one face and the member to be coupled (the conveyance face 13 or the first abutting member 11) will be described on the basis of FIGS. 9 and 10.

Note that the respective shapes of troughs 10A and 10B in the following configurations are similar to that in the configuration described above. Each following configuration will be given with a third wall 53 and a fourth wall 54 or a fifth wall 55 and a sixth wall 56 instead of the first wall 37 and the second wall 38 in the configuration described above.

Figure 9:
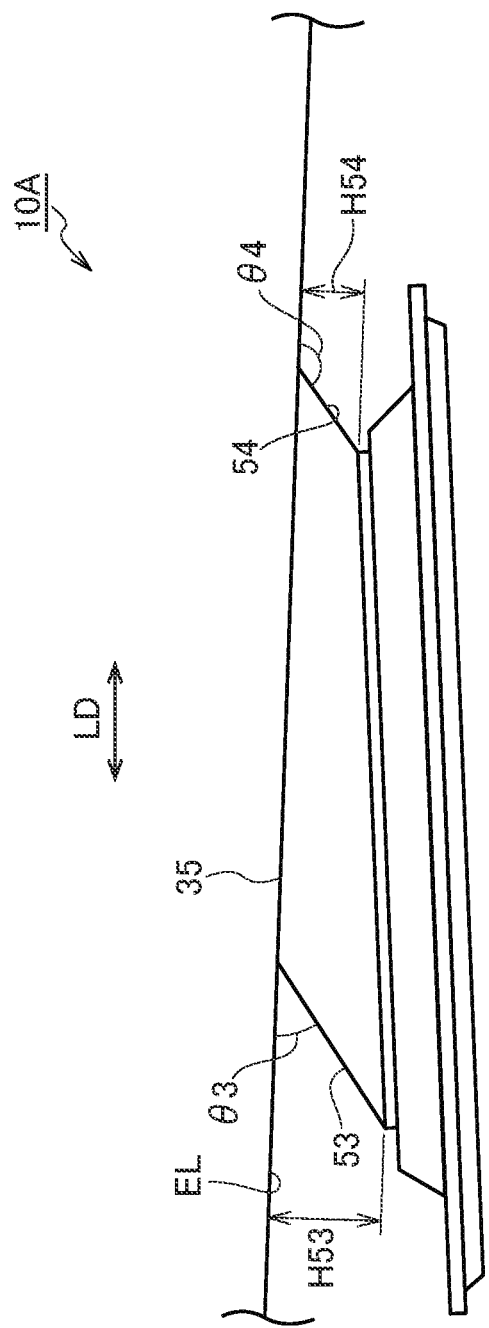
FIG. 9 is a schematic side view of a trough.

FIG. 9 is a schematic side view of the trough 10A. A wall includes the third wall 53 and the fourth wall 54 shorter in length in the vertical direction VD than the third wall 53. That is the length H53 in the vertical direction VD of the third wall 53 is longer than the length H54 in the vertical direction VD of the fourth wall 54. According to the present embodiment, the wall located on the left in FIG. 9 is the third wall 53 and the wall located on the right in FIG. 9 is the fourth wall 54. An upper-end face 35 is a non-perpendicular end face. A third angle θ3 between the outer circumferential face of the third wall 53 and a long-axis imaginary line EL extending outward from the non-perpendicular end face (upper-end face 35) in the long-axis direction LD along the non-perpendicular end face is acute. A fourth angle θ4 between the outer circumferential face of the fourth wall 54 and the long-axis imaginary line EL is obtuse. Because the third angle θ3 between the outer circumferential face of the third wall 53 and the long-axis imaginary line EL is acute, the angle between the members (the third wall 53 and the conveyance face 13) is small. The upper-end face of the outer circumferential face of the third wall 53 at the third angle θ3 is located, in the long-axis direction, inside the lower-end face of the outer circumferential face of the third wall 53, causing inconvenience in the accessibility of the welding torch. However, the length H53 in the vertical direction VD of the third wall 53 is long, causing a wide space between the members even with a small angle between the members. Thus, an enhancement can be made in the accessibility of the welding torch. That is, even in a case where the angle to the outer circumferential face of the wall is acute and the wall at the angle is located inside in the long-axis direction, a long length in the vertical direction of the wall (a long distance between the first abutting member 11 and the conveyance face 13) enables an enhancement in the accessibility of the welding torch.

Figure 10:
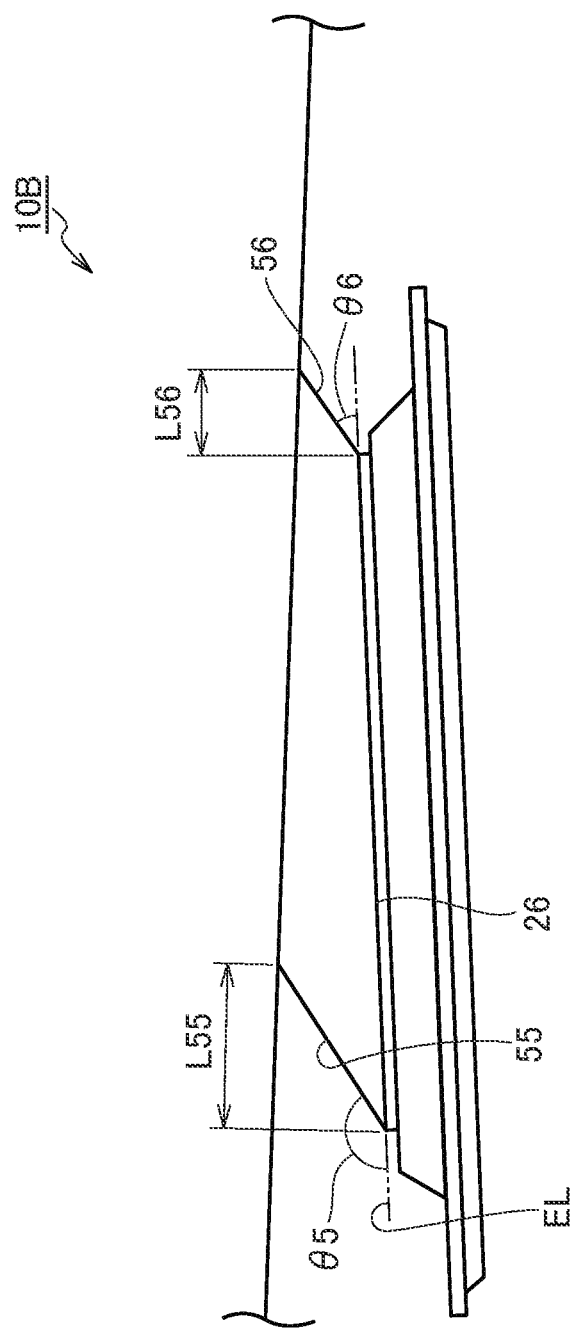
FIG. 10 is a schematic side view of a trough.

FIG. 10 is a schematic side view of the trough 10B. A wall includes the fifth wall 55 and the sixth wall 56 shorter in length in the long-axis direction LD than the fifth wall 55. That is the length L55 in the long-axis direction LD of the fifth wall 55 is longer than the length L56 in the long-axis direction LD of the sixth wall 56. The wall located on the left in FIG. 10 is the fifth wall 55 and the wall located on the right in FIG. 10 is the sixth wall 56. A lower-end face 36 is a non-perpendicular end face. A fifth angle θ5 between the outer circumferential face of the fifth wall 55 and a long-axis imaginary line EL extending outward from the non-perpendicular end face in the long-axis direction LD along the non-perpendicular end face is obtuse. A sixth angle θ6 between the outer circumferential face of the sixth wall 56 and the long-axis imaginary line EL is acute. Because the sixth angle θ6 between the outer circumferential face of the sixth wall 56 and the long-axis imaginary line EL is acute, the angle between the members (the sixth wall 56 and the first abutting member 11) is small. The lower-end face of the outer circumferential face of the sixth wall 56 at the sixth angle θ6 is located, in the long-axis direction LD, inside the upper-end face of the outer circumferential face of the sixth wall 56, causing inconvenience in the accessibility of the welding torch. However, the length L56 in the long-axis direction LD of the sixth wall 56 is short, so that the length by which the juncture 14 is recessed inside in the long-axis direction LD is relatively short. That is the length by which the welding torch is inserted can be shortened. Thus, even with a small angle between the members and a narrow space between the members, the juncture 14 is continuously welded easily with the leading end of the welding torch in contact with the juncture 14. That is, even in a case where the angle to the outer circumferential face of the wall is acute and the wall at the angle is located inside in the long-axis direction LD, a short length in the long-axis direction LD of the wall allows the length by which the welding torch is inserted to be shortened, resulting in retention of the accessibility of the welding torch.

As described above, such conveyance mechanisms 1 are used in the combination weighing apparatus 100 and each causes an article supplied from the supply mechanism, to be conveyed to the corresponding weighing hopper 105. The junctures 14 in the troughs 10, 10A, and 10B are continuously welded in order to prevent moisture from coming inside from around, so that the troughs 10, 10A, and 10B can each hygienically convey an article to be conveyed. The combination weighing apparatus 100 including the conveyance mechanisms 1 can acquire an aggregate of articles weighed as a predetermined value with a hygienic guarantee on articles.

In summary, a conveyance mechanism according to an aspect includes: a trough (10) that conveys an article; a support member (30) to which the trough is detachably coupled, the support member including a vibrator that vibrates the trough. The trough includes a conveyance member (12) that conveys the article; a plate member (11) that abuts on the support member; and a coupling member (30) that couples the conveyance member (12) and the plate member (11). The coupling member (30) has a circular shape in section and includes: a wall (23) extending in an axial direction of the circular shape; an upper-end face (35) that is located at an upper end of the wall and abuts on the conveyance member (13); and a lower-end face (26) that is located at a lower end of the wall and abuts on the support member (30). At least either the upper-end face or the lower-end face is a non-perpendicular end face that has an oval shape with a long-axis direction (LD) and a short-axis direction (SD) and is non-perpendicular in angle to an outer circumferential face of the wall. In the other words, the non-perpendicular end face is non-perpendicular in angle to the outer circumferential face of the wall, namely, has an angle different from 90 degrees. The non-perpendicular end face has an angle different from 90 degrees to the outer circumferential face, and has a larger sectional area, in comparison to a mode in which the angle to the outer circumferential face is 90 degrees. A larger sectional area of the non-perpendicular end face facilitates access to the juncture of the non-perpendicular end face, so that the juncture is continuously welded easily. A larger sectional area of the non-perpendicular end face enables securing of the juncture in length, so that a rise can be made in juncture strength. Because the non-perpendicular end face is oval in shape, the length in the long-axis direction can be secured long. A long-axis portion is disposed corresponding to a portion to which it is difficult to put the welding torch, so that an enhancement can be made in the accessibility of the welding torch.

According to a preferred aspect, a sectional shape of the coupling member at 90 degrees to the outer circumferential face of the wall is perfectly circular, and the long-axis direction (LD) of the non-perpendicular end face is non-perpendicular to the outer circumferential face of the wall. The sectional shape at 90 degrees to the outer circumferential face of the wall is perfectly circular, and diagonally cutting a cylinder perfectly circular in shape or a column perfectly circular in shape enables acquisition of a non-perpendicular end face oval in shape. An appropriate change in cutting angle enables appropriate setting of the aspect ratio of an oval shape, so that the coupling member having a sectional shape having a desired aspect ratio can be acquired. Because the long-axis direction of the non-perpendicular end face is non-perpendicular to the outer circumferential face, the position of the upper-end face located at the upper end of the wall and the position of the lower-end face located at the lower end of the wall are not identical in the long-axis direction. Thus, in comparison to a configuration in which the position of the upper-end face and the position of the lower-end face are identical, the leading end of the welding torch is inserted easier, so that the junctions are continuously welded easier.

According to a preferred aspect, in a section along the long-axis direction and a vertical direction, the wall includes a first wall (27) located on one side in the long-axis direction and a second wall (28) located on another side in the long-axis direction, the upper-end face and the lower-end face are each the non-perpendicular end face, a first upper angle (011) between an outer circumferential face of the first wall and an upper-end imaginary line (XL) extending outward from the upper-end face in the long-axis direction along the upper-end face is acute, a second upper angle (021) between an outer circumferential face of the second wall and the upper-end imaginary line is obtuse, a first lower angle (012) between the outer circumferential face of the first wall and a lower-end imaginary line (YL) extending outward from the lower-end face in the long-axis direction along the lower-end face is obtuse, a second lower angle (022) between the outer circumferential face of the second wall and the lower-end imaginary line is acute, a length (H27) in the vertical direction of the first wall is longer than a length (H28) in the vertical direction of the second wall, and a length (L28) in the long-axis direction of the second wall is shorter than a length (L27) in the long-axis direction of the first wall. According to the present aspect, the first upper angle between the outer circumferential face of the first wall and the upper-end imaginary line is acute, so that the angle between the first wall and the conveyance member is small. However, the length (H27) in the vertical direction of the first wall is long, causing a wide space between the members even with a small angle between the members. Thus, an enhancement can be made in the accessibility of the welding torch. The second lower angle between the outer circumferential face of the second wall and the lower-end imaginary line is acute, so that the angle between the second wall and the plate member is small. However, the length (L28) in the long-axis direction of the second wall is short, so that the length by which the juncture is recessed inside in the long-axis direction is relatively short. That is the length by which the welding torch is inserted can be shortened. Thus, even with a small angle between the members and a narrow space between the members, the juncture is continuously welded easily with the leading end of the welding torch in contact with the juncture.

According to a preferred aspect, in a section along the long-axis direction and a vertical direction, the wall includes a third wall (53) located on one side in the long-axis direction and a fourth wall (54) that is located on another side in the long-axis direction and is shorter in length in the vertical direction than the third wall. A third angle (03) between an outer circumferential face of the third wall and a long-axis imaginary line (EL) extending outward from the non-perpendicular end face in the long-axis direction along the non-perpendicular end face is acute, and a fourth angle (04) between an outer circumferential face of the fourth wall and the long-axis imaginary line (EL) is obtuse. The third angle between the outer circumferential face of the third wall and the long-axis imaginary line is acute, so that the angle between the members (the third wall and the conveyance member or the third wall and the plate member) is small. However, the length (H53) in the vertical direction of the third wall is long, causing a wide space between the members even with a small angle between the members. Thus, an enhancement can be made in the accessibility of the welding torch.

According to a preferred aspect, in a section along the long-axis direction and a vertical direction, the wall includes a fifth wall (55) located on one side in the long-axis direction and a sixth wall (56) that is located on another side in the long-axis direction and is shorter in length in the long-axis direction than the fifth wall. A fifth angle (05) between an outer circumferential face of the fifth wall and a long-axis imaginary line (EL) extending outward from the non-perpendicular end face in the long-axis direction along the non-perpendicular end face is obtuse, and a sixth angle (06) between an outer circumferential face of the sixth wall and the long-axis imaginary line (EL) is acute. The sixth angle between the outer circumferential face of the sixth wall and the long-axis imaginary line is acute, so that the angle between the members (the sixth wall and the conveyance member or the sixth wall and the plate member) is small. However, the length (L56) in the long-axis direction of the sixth wall is short, so that the length by which the juncture is recessed inside in the long-axis direction is relatively short. That is the length by which the welding torch is inserted can be shortened. Thus, even with a small angle between the members and a narrow space between the members, the juncture is continuously welded easily with the leading end of the welding torch in contact with the juncture.

A combination weighing apparatus according to an aspect includes: a plurality of the above conveyance mechanisms (1); a supply mechanism of supplying articles; a plurality of weighing hoppers (105) that is provided downstream of the supply mechanism and each temporarily stores an article in order to measure a weight of the article; and a gathering chute (106) that gathers the articles discharged from the plurality of weighing hoppers. The plurality of the conveyance mechanisms conveys the articles supplied from the supply mechanism, to the plurality of weighing hoppers. According to the present aspect, the junctures in each trough are continuously welded in order to prevent moisture from coming inside from around, so that each trough can hygienically convey an article to be conveyed. Thus, acquired can be an aggregate of articles weighed as a predetermined value with a hygienic guarantee on articles.

The embodiment of the present invention has been described in detail above. It is obvious to a person skilled in the art that the present invention is not limited to the embodiment in the present specification. The present invention can be carried out in aspects corrected and altered without departing from the gist and scope of the present invention in the claims. Therefore, the present specification is intended for exemplificative description and thus does not have any limitative meanings to the present invention.

REFERENCE SIGNS LIST

1: conveyance mechanism
10, 10A, 10B: trough
11: first abutting member
12: first circumferential edge
13: conveyance face (conveyance member)
14: juncture
20: support member 21: second abutting member
22: second circumferential edge
23: through hole
25: abutting face
26: non-abutting face
27: wall
28: vibrator
29: waterproof cover
30: coupling member (fastening band)
33: wall
34: outer circumferential face
35: upper-end face
36: lower-end face
37: first wall
38: second wall
53: third wall
54: fourth wall
55: fifth wall
56: sixth wall
100: combination weighing apparatus
101: supply chute (supply mechanism)
102: distribution table (supply mechanism)
103: radial feeder (conveyance mechanism)
104: pool hopper
105: weighing hopper
106: gathering chute
107: timing hopper
EL: long-axis imaginary line
HD: horizontal direction
LD: long-axis direction
SD:
short-axis direction
vertical direction
VD:
XL: upper-end imaginary line
YL: lower-end imaginary line
θ11: first upper angle
θ12: first lower angle
θ21: second upper angle
θ22: second lower angle
θ3: third angle
θ4: fourth angle
θ5: fifth angle
θ6: sixth angle

What is claimed is:

1. A conveyance mechanism comprising:
a trough that conveys an article;
a support member to which the trough is detachably coupled, the support member including a vibrator that vibrates the trough; and
a coupling member that couples the trough and the support member, wherein
the trough includes a first abutting member that is located on a back side of a conveyance face for conveyance of the article and abuts on the support member,
the support member includes a second abutting member that is plate-shaped and has a second circumferential edge vertically identical to a first circumferential edge that is a circumferential edge of the first abutting member,
the coupling member couples the trough and the support member by fastening the first abutting member and the second abutting member with the first circumferential edge and the second circumferential edge in superposition,
the second abutting member is provided with a first through hole passing through the second abutting member and a second through hole through which a fastener is inserted, the first through hole being left open in a state where the second abutting member is assembled as part of the support member,
the second abutting member includes, in a coupling state where the second abutting member is coupled to the first abutting member by the coupling member, an abutting face abutting on the first abutting member and a non-abutting face spaced apart from the first abutting member, and
at least part of the first through hole is provided at the non-abutting face.

2. The conveyance mechanism according to claim 1, wherein
the first abutting member and the second abutting member have an oval shape with a long-axis direction and a short-axis direction, and
at least part of the first through hole is provided at an end in the long-axis direction of the second abutting member.

3. The conveyance mechanism according to claim 2, wherein
the second abutting member is disposed at a slant from a horizontal direction, and
at least part of the first through hole is disposed below a center in a vertical direction of the second abutting member.

4. The conveyance mechanism according to claim 1, wherein
the vibrator is coupled to a face opposite to a face that the second abutting member has closer to the first abutting member,
the support member includes a waterproof cover covering a coupled portion between the vibrator and the second abutting member, and
the first through hole is provided closer to the second circumferential edge than to a region overlapping the waterproof cover.

5. A combination weighing apparatus comprising:
a plurality of the conveyance mechanisms according to claim 1;
a supply mechanism of supplying articles;
a plurality of weighing hoppers that is provided downstream of the supply mechanism and each temporarily stores an article in order to measure a weight of the article; and
a gathering chute that gathers the articles discharged from the plurality of weighing hoppers, wherein
the plurality of the conveyance mechanisms conveys the articles supplied from the supply mechanism, to the plurality of weighing hoppers.

6. A conveyance mechanism comprising:
a trough that conveys an article;
a support member to which the trough is detachably coupled, the support member including a vibrator that vibrates the trough; and
a coupling member that couples the trough and the support member, wherein
the trough includes a first abutting member that is located on a back side of a conveyance face for conveyance of the article and abuts on the support member,
the support member includes a second abutting member that is plate-shaped and has a second circumferential edge vertically identical to a first circumferential edge that is a circumferential edge of the first abutting member, the coupling member couples the trough and the support member by fastening the first abutting member and the second abutting member with the first circumferential edge and the second circumferential edge in superposition, the second abutting member is provided with a through hole passing through the second abutting member, the second abutting member includes, in a coupling state where the second abutting member is coupled to the first abutting member by the coupling member, an abutting face abutting on the first abutting member and a non-abutting face spaced apart from the first abutting member, at least part of the through hole is provided at the non-abutting face, the second abutting member includes a wall extending from the abutting face to the non-abutting face, away from the first abutting member, and at least part of the through hole is provided astride the wall and the non-abutting face.

7. A conveyance mechanism comprising:

a trough that conveys an article;

a support member to which the trough is detachably coupled, the support member including a vibrator that vibrates the trough; and a coupling member that couples the trough and the support member, wherein the trough includes a first abutting member that is located on a back side of a conveyance face for conveyance of the article and abuts on the support member, the support member includes a second abutting member that is plate-shaped and has a second circumferential edge vertically identical to a first circumferential edge that is a circumferential edge of the first abutting member, the coupling member couples the trough and the support member by fastening the first abutting member and the second abutting member with the first circumferential edge and the second circumferential edge in superposition, the second abutting member is provided with a through hole passing through the second abutting member, the coupling member has a circular shape in section and includes:
  a wall extending in an axial direction of the circular shape;
  an upper-end face that is located at an upper end of the wall and abuts on the conveyance face; and
  a lower-end face that is located at a lower end of the wall and abuts on the support member, and at least either the upper-end face or the lower-end face is a non-perpendicular end face that has an oval shape with a long-axis direction and a short-axis direction and is non-perpendicular in angle to an outer circumferential face of the wall.

8. The conveyance mechanism according to claim 7, wherein
  a sectional shape of the coupling member at 90 degrees to the outer circumferential face of the wall is perfectly circular, and
  the long-axis direction of the non-perpendicular end face is non-perpendicular to the outer circumferential face of the wall.

9. The conveyance mechanism according to claim 7, wherein
  in a section along the long-axis direction and a vertical direction, the wall includes a first wall located on one side in the long-axis direction and a second wall located on another side in the long-axis direction,
  the upper-end face and the lower-end face are each the non-perpendicular end face,
  a first upper angle between an outer circumferential face of the first wall and an upper-end imaginary line extending outward from the upper-end face in the long-axis direction along the upper-end face is acute,
  a second upper angle between an outer circumferential face of the second wall and the upper-end imaginary line is obtuse,
  a first lower angle between the outer circumferential face of the first wall and a lower-end imaginary line extending outward from the lower-end face in the long-axis direction along the lower-end face is obtuse,
  a second lower angle between the outer circumferential face of the second wall and the lower-end imaginary line is acute,
  a length in the vertical direction of the first wall is longer than a length in the vertical direction of the second wall, and
  a length in the long-axis direction of the second wall is shorter than a length in the long-axis direction of the first wall.

10. The conveyance mechanism according to claim 7, wherein
  in a section along the long-axis direction and a vertical direction, the wall includes a third wall located on one side in the long-axis direction and a fourth wall that is located on another side in the long-axis direction and is shorter in length in the vertical direction than the third wall,
  a third angle between an outer circumferential face of the third wall and a long-axis imaginary line extending outward from the non-perpendicular end face in the long-axis direction along the non-perpendicular end face is acute, and a fourth angle between an outer circumferential face of the fourth wall and the long-axis imaginary line is obtuse.

11. The conveyance mechanism according to claim 7, wherein
  in a section along the long-axis direction and a vertical direction, the wall includes a fifth wall located on one side in the long-axis direction and a sixth wall that is located on another side in the long-axis direction and is shorter in length in the long-axis direction than the fifth wall,
  a fifth angle between an outer circumferential face of the fifth wall and a long-axis imaginary line extending outward from the non-perpendicular end face in the long-axis direction along the non-perpendicular end face is obtuse, and
  a sixth angle between an outer circumferential face of the sixth wall and the long-axis imaginary line is acute.

12. A combination weighing apparatus comprising:
  a plurality of the conveyance mechanisms according to claim 7;
  a supply mechanism of supplying articles;
  a plurality of weighing hoppers that is provided downstream of the supply mechanism and each temporarily stores an article in order to measure a weight of the article; and
  a gathering chute that gathers the articles discharged from the plurality of weighing hoppers, wherein the plurality of the conveyance mechanisms conveys the articles supplied from the supply mechanism, to the plurality of weighing hoppers.

* * * * *